United States Patent
Huang et al.

(10) Patent No.: US 9,661,671 B2
(45) Date of Patent: May 23, 2017

(54) TRANSMISSION DEVICES, RECEIVING DEVICES AND METHODS OF SHARING DATA

(71) Applicant: MediaTek Singapore Pte. Ltd., Singapore (SG)

(72) Inventors: Yanni Huang, Beijing (CN); Zhonge Wu, Beijing (CN); Chin-Ying Hsieh, New Taipei (TW); Kai-wen Liu, Taipei (TW)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 162 days.

(21) Appl. No.: 14/607,242

(22) Filed: Jan. 28, 2015

(65) Prior Publication Data

US 2015/0215983 A1    Jul. 30, 2015

(30) Foreign Application Priority Data

Jan. 29, 2014    (CN) .......................... 2014 1 0043790

(51) Int. Cl.
*H04W 76/02* (2009.01)
*H04W 4/00* (2009.01)
*G06F 1/16* (2006.01)
*G06F 3/041* (2006.01)

(52) U.S. Cl.
CPC ........ *H04W 76/023* (2013.01); *G06F 1/1698* (2013.01); *G06F 3/0416* (2013.01); *H04W 4/008* (2013.01)

(58) Field of Classification Search
CPC .... G06F 1/1698; G06F 3/0416; H04W 4/008; H04W 76/023
See application file for complete search history.

(56) References Cited

U.S. PATENT DOCUMENTS

| | | | |
|---|---|---|---|
| 7,730,236 B2 * | 6/2010 | Hu | G06F 21/85 710/17 |
| 9,531,439 B2 * | 12/2016 | Kuo | G06F 3/041 |
| 9,532,200 B2 * | 12/2016 | Yae | H04W 4/16 |
| 9,535,553 B2 * | 1/2017 | Huang | H04W 4/008 |
| 9,547,363 B2 * | 1/2017 | Hsiao | G06F 1/3287 |
| 2006/0160569 A1 * | 7/2006 | Chen | H04M 1/72527 455/557 |

(Continued)

*Primary Examiner* — Lewis West
(74) *Attorney, Agent, or Firm* — McClure, Qualey & Rodack, LLP

(57) ABSTRACT

A transmission device, a receiving device and a method of sharing data are provided. The transmission device includes a touch-display module which includes one or a plurality of display areas, wherein each of the display areas displays a respective display result corresponding to the same or different applications; a link module which is configured to establish a touch link with one or a plurality of receiving devices through the touch-display module; a judgment module which is configured to determine the display area which the receiving device is in physical proximity to, to generate the judgment information; a management module which is configured to generate application information according to the judgment information; and a sending module, configured to transmit the application information to the receiving device through the touch-display module.

23 Claims, 9 Drawing Sheets

(56) References Cited

U.S. PATENT DOCUMENTS

| | | | |
|---|---|---|---|
| 2006/0208860 A1* | 9/2006 | Park | G06K 7/0008 340/10.2 |
| 2011/0276495 A1* | 11/2011 | Varadarajan | G06F 21/31 705/71 |
| 2011/0304583 A1* | 12/2011 | Kruglick | G06F 3/044 345/174 |
| 2013/0095756 A1* | 4/2013 | Hamilton | H04W 4/001 455/41.1 |
| 2013/0196596 A1* | 8/2013 | Parekh | G06F 1/1643 455/41.1 |
| 2013/0229362 A1* | 9/2013 | Liu | G06F 3/041 345/173 |
| 2013/0232450 A1* | 9/2013 | Dearman | G06F 3/017 715/835 |
| 2014/0081858 A1* | 3/2014 | Block | G07F 19/207 705/43 |
| 2014/0087658 A1* | 3/2014 | Hou | G06F 3/041 455/41.1 |
| 2014/0120840 A1* | 5/2014 | Yan | G06F 3/0486 455/41.2 |
| 2014/0176991 A1* | 6/2014 | Yun | H04W 64/00 358/1.15 |
| 2015/0194129 A1* | 7/2015 | Yan | H04W 4/20 345/173 |
| 2015/0312879 A1* | 10/2015 | Lagnado | H04B 5/02 455/41.1 |

* cited by examiner

TRANSMISSION DEVICES, RECEIVING DEVICES AND METHODS OF SHARING DATA

CROSS REFERENCE TO RELATED APPLICATIONS

This Application claims priority of China Patent Application No. 201410043790.1, filed on Jan. 29, 2014, the entirety of which is incorporated by reference herein.

BACKGROUND OF THE INVENTION

Field of the Invention

The present invention relates to a method of sharing data, and in particular to a method of sharing data by touch link technology.

Description of the Related Art

Recently, because of the rapid development of wireless communications, portable devices, such as smartphones, personal digital assistants, and tablet PCs, are available, and have become more and more technically advanced and multifunctional. Due to increased convenience and functionality of the devices, these devices have become necessities of life.

With the development of short-range wireless communications, more and more short-range wireless communications standards are specified, such as Bluetooth, 802.11(Wi-Fi), ZigBee, Ultra Wide Band (UWB), Near Field Communication (NFC), etc.

Near Field Communication (NFC) is a contactless technology for identification and interconnection. Near Field Communication allows users to exchange the information, access contact and services by using the near field magnetic communication (such as the near field magnetic communication of 13.56 MHz) between the mobile devices, consumer electronics, PCs or smart electronic devices.

Due to the maturity of the market, a mobile phone with NFC can either support a mobile payment function or serve as a point of sale (POS) device. However, a proximity card reader or a like element must be added to the handheld device due to the NFC being operated by sending and receiving a signal, and that will make the size of the handheld device become larger, and the layout and the elements of the handheld device might be limited.

A touch-and-connect (touch link) technology of the touch panel device which uses the existing panel and driver IC for communication has been developed recently, and has been described in US 2011/0304583, US 2013/0147760, CN 102916729A. The touch panel device includes a touch sensor. At least part of a touch sensor includes at least a part of the touch panel of the touch panel device. The touch panel can be the touch panel without a display function, such as the touch pad, or with a display function, such as a touch screen. The touch sensor includes driving electrodes and sensing electrodes set on the board set of the board for forming the capacitance structure. At least one of the driving electrodes and the sensing electrodes is used as the sending electrode, and at least one is used as the receiving electrode. Thus, the signal can be sent and received by the existing electrodes and driver IC of the touch panel device for achieving the touch transmission based on the electric field without additional proximity card readers or like elements, reducing the size and cost of the touch panel device.

FIG. 1 is a schematic diagram of the touch transmission between a first touch panel device and a second touch panel device in accordance with the prior art. As shown in FIG. 1, there are near fields 103a and 103b between the first touch panel device 101 and the second touch panel device 102. It should be noted that the first touch panel device 101 and the second touch panel device 102 are enabled to send and receive the signal. The first touch panel device 101 sends the signal to the second touch panel device 102 through a communication media which has an electric field pointed to the second touch panel device 102 (the near field 103a as shown in FIG. 1). The second touch panel device 102 sends the signal to the first touch panel device 101 through a communication media which has an electric field pointed to the first touch panel device 101 (the near field 103b as shown in FIG. 1). The X channel and the Y channel shown in FIG. 1 are used as the sending electrodes and the receiving electrodes set on the board for forming the capacitance structure.

FIG. 2 is a logic chart for achieving the touch transmission system between the first touch panel device and the second touch panel device in accordance with the prior art. The first touch panel device includes a signal sending system 201, shown in FIG. 2, and the second touch panel device includes a signal receiving system 202, also shown in FIG. 2. The signal sending system 201 includes a touch transmission request signal generation unit 211, a communication connection establishing unit 212 and a first communication unit 213. The touch transmission request signal generation unit 211 is used to generate a request signal for touch transmission to the second touch panel 102 through the sending electrode. The communication connection establishing unit 212 establishes a communication connection with the second touch panel device 102 after the receiving electrodes receive a response signal from the second touch panel device 102. The first communication unit 213 sends the communication information or the data to the second touch panel device 102 through the sending electrodes after the communication connection is established.

The signal receiving system 202 includes a touch transmission request response unit 221, a communication connection establishing unit 222 and a second communication unit 223. The touch transmission request response unit 221 responds with an acknowledge signal to the first touch panel device 101 through the sending electrodes after the receiving electrodes receive a touch transmission request signal sent from the first touch panel device 101. The communication connection establishing unit 222 establishes the communication connection with the first touch panel device 101 after the touch transmission request response unit 221 responds with the acknowledge signal to the first touch panel device 101. The second communication unit 223 receives the communication information or the data sent from the first touch panel device 101 through the receiving electrodes after the communication connection is established.

FIG. 3 is a schematic illustrating the transmission and reception of the signal by the electrodes of the touch panel of the prior art. As shown in FIG. 3, the touch sensor (not shown) includes the sending electrodes 311, 321 and the receiving electrodes 312, 322 disposed on the board (such as the first touch panel 301 or the second touch panel 302) for forming the capacitance structure. The sending electrodes 311, 321 are used to send the signal, and the receiving electrodes 312, 322 are used to receive the signal.

FIG. 4 is a flow chart of the touch connection method in accordance with the prior art. First, in step S401, the touch connection request signal generation unit 211 generates a touch connection request signal, and sends it to the second touch panel device 102 through the sending electrodes. Then the receiving electrodes receive the acknowledge signal from the second touch panel device 102 (step S402). After that, the communication connection establishing unit 212 establishes the communication connection with the second touch panel device 102 (step S403). Finally, the method goes to step S404, and the first communication unit 213 sends the communication information or the data to the second touch panel device 102 through the sending electrodes.

Traditionally, when the user needs to use the receiving device to display the application and file which are being executed on the transmission device at the same time, the user needs to perform that by complex operation, or downloading the same application and file on the receiving device. Therefore, how to make the receiving devices able to display the same or different applications and files which are being executed on the transmission device at the same time or individually for the user by the touch link technology is worthy of discussion.

BRIEF SUMMARY OF THE INVENTION

A transmission device, receiving device and a method of sharing data are provided to overcome the problems mentioned above.

An embodiment of the invention provides a transmission device. The transmission device comprises a touch-display module, a link module, a judgment module, a management module, and a sending module. The touch-display module comprises one or more display areas, wherein each of the display areas displays a respective display result corresponding to the same or different applications. The link module is configured to establish a touch link with one or more receiving devices through the touch-display module. The judgment module is configured to determine the display area which the receiving device is in physical proximity to, to generate the judgment information. The management module is configured to generate application information according to the judgment information. The sending module is configured to transmit the application information to the receiving device through the touch-display module.

An embodiment of the invention provides a receiving device. The receiving device comprises a touch-display module, a link module, and a receiving module. The touch-display module is configured to be in physical proximity to one or more display areas of the transmission device. The link module is configured to establish a touch link with the transmission device through the touch-display module. The receiving module is configured to receive application information corresponding to the display area in physical proximity from the transmission device through the touch-display module, wherein the touch-display module displays a display result corresponding to the application information according to the application information.

An embodiment of the invention provides a method of sharing data applied to a transmission device. The method comprises the steps of displaying a display result of the application executed on a display area of the transmission device or displaying display results of different applications executed on a plurality of display areas of the transmission device, wherein the display areas are comprised in a touch-display module; establishing a touch link with one or a plurality of receiving devices through the touch-display module; determining the display area which the receiving device is in physical proximity to, to generate the judgment information; generating application information according to the judgment information; and transmitting the application information to the receiving device through the touch-display module.

An embodiment of the invention provides a method of sharing data for a receiving device. The method comprises the steps of a receiving device coming into physical proximity to one or more display areas of a transmission device; the receiving device establishing a touch link with the transmission devices; receiving application information corresponding to the display area in physical proximity from the transmission device; and displaying a display result corresponding to the application information according to the application information.

Other aspects and features of the invention will become apparent to those with ordinary skill in the art upon review of the following descriptions of specific embodiments of communication transmission methods and systems.

BRIEF DESCRIPTION OF THE DRAWINGS

The invention will become more fully understood by referring to the following detailed description with reference to the accompanying drawings, wherein.

DETAILED DESCRIPTION OF THE INVENTION

Certain terms and figures are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection.

The following descriptions are the best embodiments to implement the present invention, which are utilized to illustrate the inventive principles of the present invention rather than limit them. It should be understood that the embodiments of the present invention could be implemented by software, hardware, components or their combinations.

Figure 1:
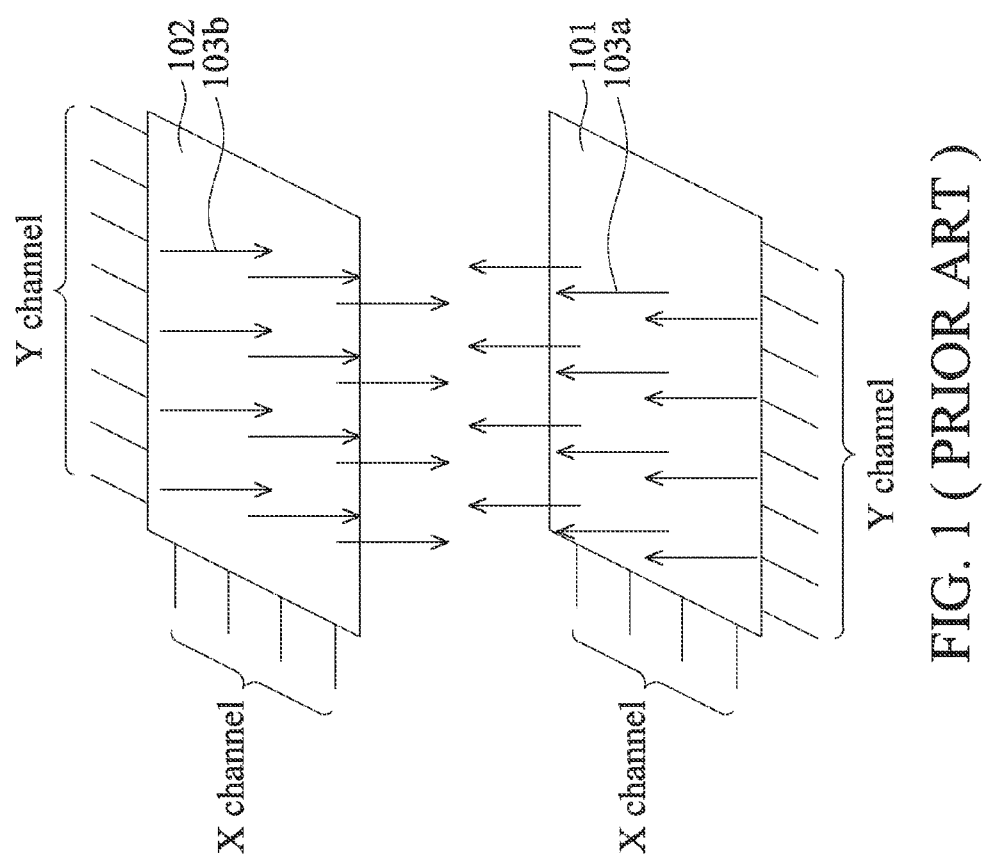
FIG. 1 is a schematic diagram of the touch connection between a first touch panel device and a second touch panel device in accordance with the prior art.
Figure 2:
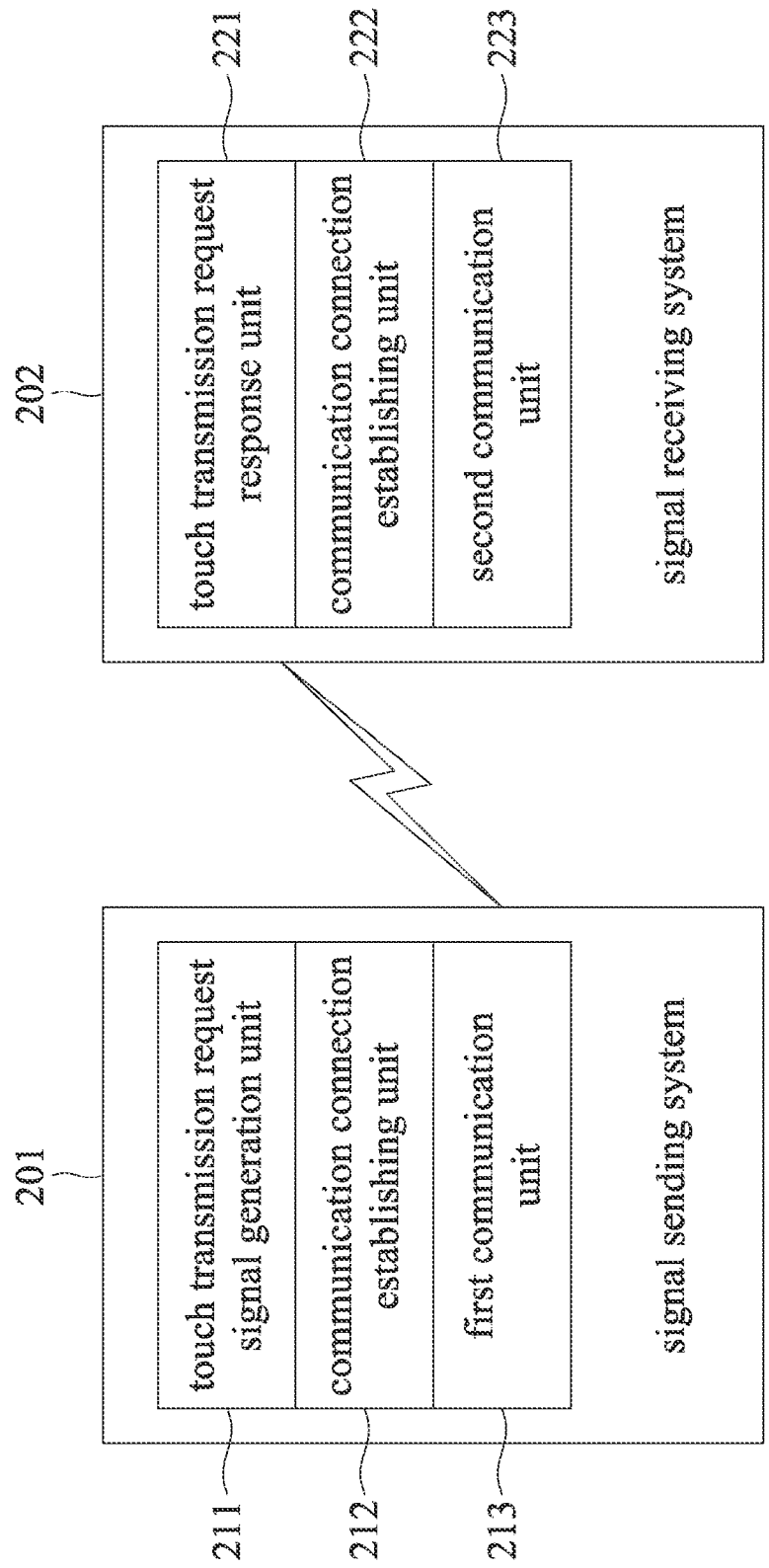
FIG. 2 is a logic chart for achieving the touch connection system between the first touch panel device and the second touch panel device in accordance with the prior art.
Figure 3:
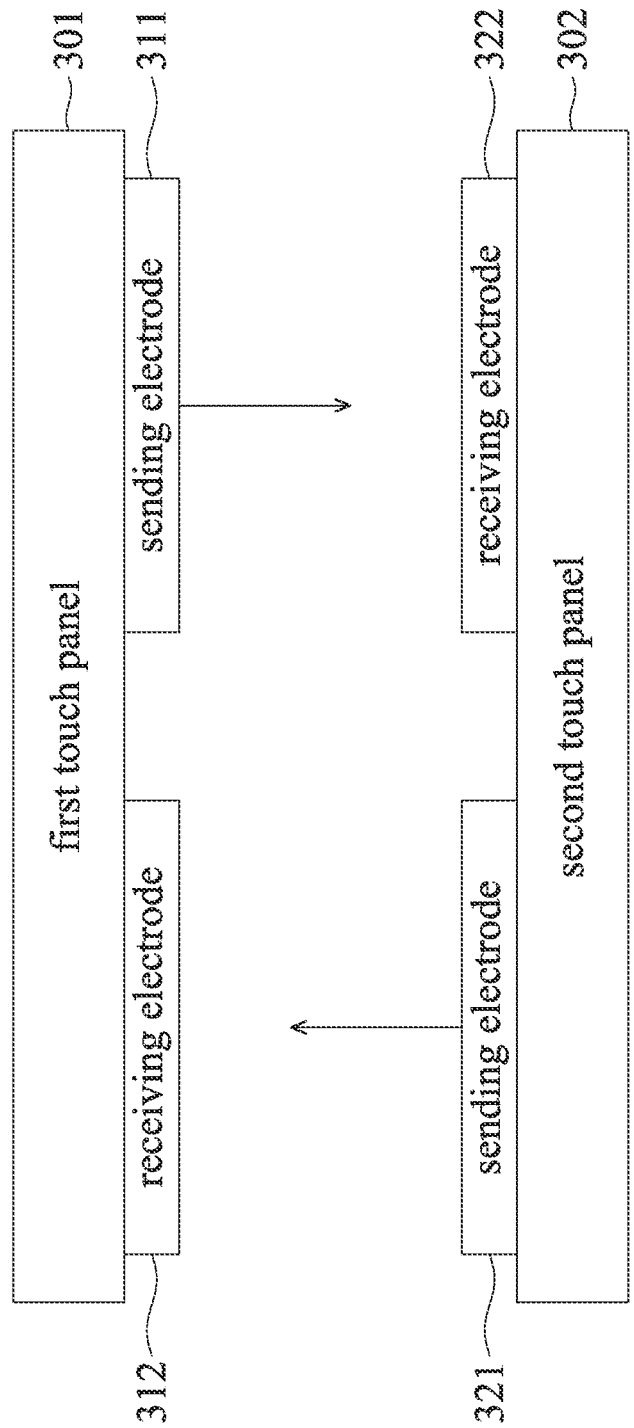
FIG. 3 is a schematic diagram illustrating the transmission and reception of the signal by the electrodes of the touch panel with the prior art.
Figure 4:
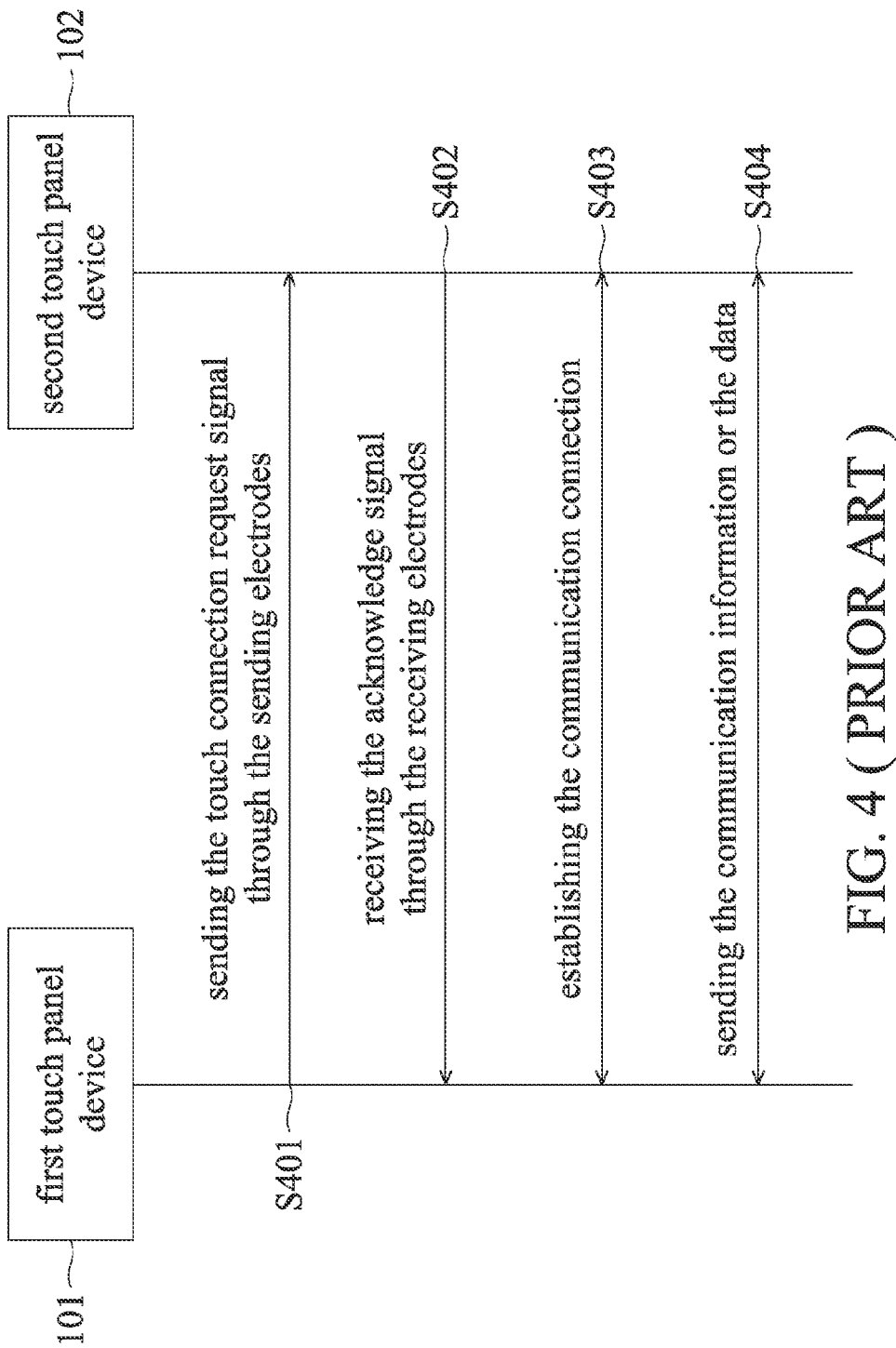
FIG. 4 is a flow chart of the touch connection method in accordance with the prior art.
Figure 5:
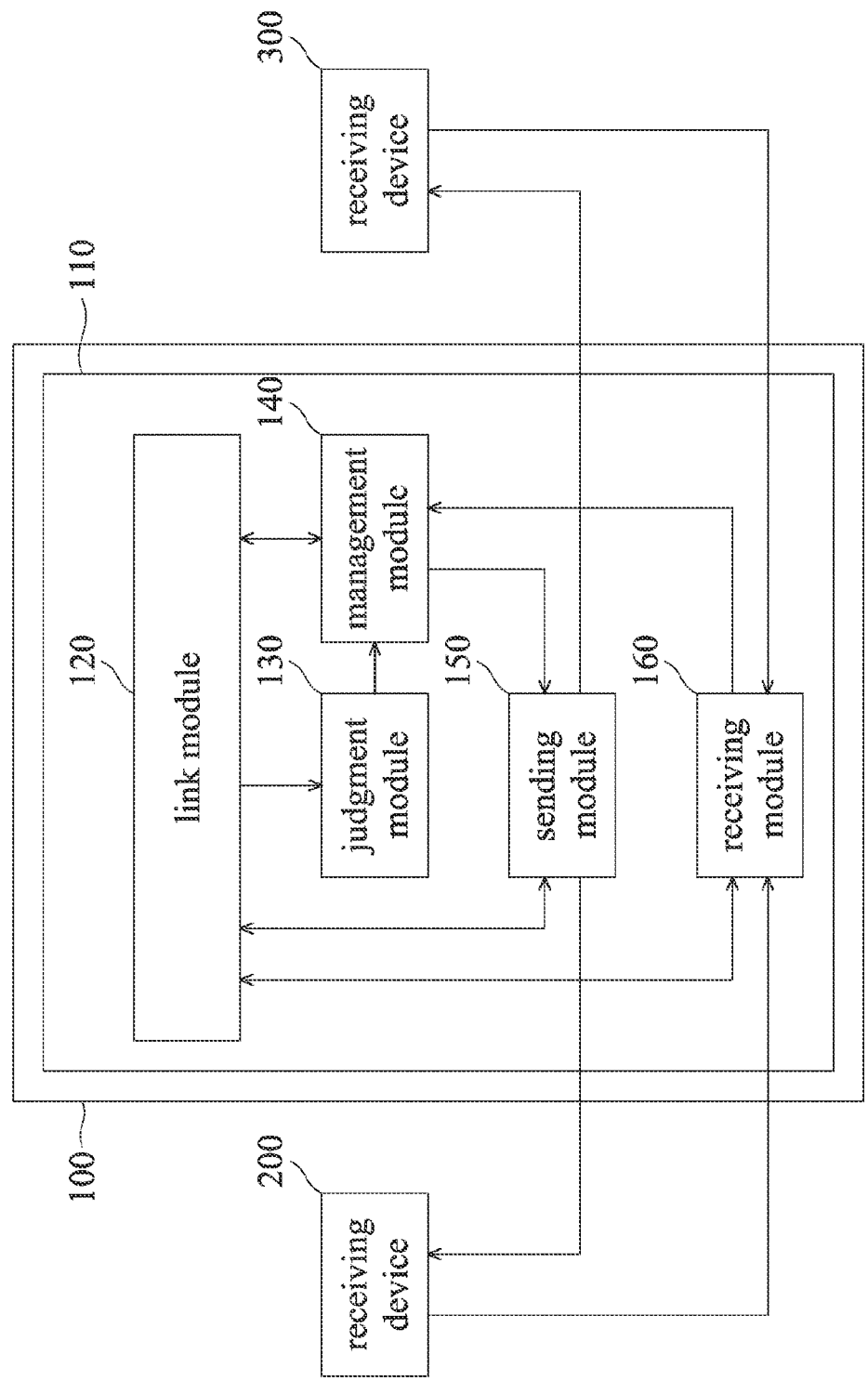
FIG. 5 is a schematic diagram illustrating a transmission device 100 according to an embodiment of the invention.

FIG. 5 is a schematic diagram illustrating a transmission device 100 according to an embodiment of the invention. The transmission device 100 may be a personal digital assistant (PDA), smartphone, tablet or other device with touch functionality. As shown in FIG. 5, in an embodiment of the invention, the transmission device 100 includes a touch-display module 110, link module 120, judgment module 130, management module 140, sending module 150 and receiving module 160. The transmission device 100 of FIG. 5 is only to clarify the concept of the invention, but the invention should not be limited thereto. The transmission device 100 can also include other modules and elements.

In an embodiment of the invention, the touch-display module 110 is a screen or panel with touch functionality, i.e. a touch panel with display function. The link module 120 includes the touch transmission technology shown in FIG. 1-FIG. 4. The judgment module 130 and the management module 140 are the processing units, processors, or elements combined in the processing units or processors. The sending module 150 and receiving module 160 are configured to transmit and receive signals or data through the touch-display module 110. For example, the touch-display module 110 is regarded as a sending antenna and receiving antenna (or antenna groups). Note that the link module 120, sending module 150 and receiving module 160 may be independent modules, or the link module 120 may include the sending module 150 and receiving module 160, i.e. the sending module 150 and receiving module 160 are combined in the link module 120 to transmit and receive signals and data.

The receiving device 200 and receiving device 300 are personal digital assistants (PDA), smartphones, tablets or other devices with touch functionality. In addition, the transmission device 100, the receiving device 200 and the receiving device 300 are electrical devices which support the touch link technology illustrated in FIG. 1-FIG. 4. Note that FIG. 5 only shows the transmission device 100, the receiving device 200 and the receiving device 300, but the invention should not be limited thereto. The transmission device 100 can also share data with more receiving devices.

In an embodiment of the invention, the touch-display module 110 includes one or more display areas, wherein each of the display areas displays the respective result corresponding to the same or different applications which are being executed by the transmission device 100. For example, the user can search data using the browser, play music or videos, or browse pictures on different display areas. FIG. 6A is a schematic diagram illustrating the touch-display module 110 according to an embodiment of the invention. As shown in FIG. 6A, the touch-display module 110 includes display area Al and display area A2. For example, the user can display a movie on display area Al and the user can browse through the web pages on display area A2. In an embodiment of the invention, the forms of the display areas include the full screen window, half screen window, or suspension window (i.e. Picture-in-Picture, PIP).

In an embodiment of the invention, when the touch-link functions of the transmission device 100, the receiving device 200 and the receiving device 300 are enabled, the transmission device 100 utilizes the link module 120 to establish a link with the receiving device 200 and the receiving device 300 through the touch-link technology.

Taking the transmission device 100 and the receiving device 200 for example, when establishing a touch-link between the transmission device 100 and the receiving device 200, a physical-proximity operation is performed for the touch-display module 110 of the transmission device 100 and the receiving device 200 to generate the physical-proximity signal. The link module 120 establishes the touch-link between the transmission device 100 and the receiving device 200 according to the physical-proximity signal. Note that the physical-proximity operation is regarded as the proximity between the devices or the touch between the devices. When the distance between the touch-display module 110 of the transmission device 100 and the receiving device 200 is shorter than a default value (e.g. 5 mm), the transmission device 100 and the receiving device 200 are considered as the physical-proximity. When the touch-link has been established, the link module 120 and the receiving device 200 may first set the transmission parameters and confirm the transmission methods. For example, the link module 120 and the receiving device 200 may first determine the wireless transmission methods for different situations to transmit the data and signals. For example, if the throughput is higher than the default value, the link module 120 and the receiving device 200 may utilize Wi-Fi, Bluetooth, or other suitable wireless transmission technologies to perform transmission, and if the throughput is lower than or equal to the default value, the link module 120 and the receiving device 200 may utilize the touch-link technology to perform transmission. For another example, if the distance between the link module 120 and the receiving device 200 is longer than the default value, the link module 120 and the receiving device 200 may utilize the Wi-Fi, Bluetooth, or other suitable wireless transmission technologies to perform transmission, and if the distance between the link module 120 and the receiving device 200 is shorter than or equal to the default value, the link module 120 and the receiving device 200 may utilize the touch-link technology to perform transmission. Note that when the transmission device 100 and the receiving device 200 utilize the Wi-Fi, Bluetooth, or other suitable wireless transmission technologies to perform transmission, the transmission device 100 and the receiving device 200 don't need to perform extra matching operations, because when the touch-link between the transmission device 100 and the receiving device 200 has been established through the touch link technology, the matching parameters for other wireless transmission technologies have also been set.

In an embodiment of the invention, the transmission device 100 may establish a touch-link with the receiving device 200 and the receiving device 300 through the link module 120 at the same time, or establish a touch-link with the receiving device 200 and the receiving device 300 through the link module 120 individually.

In an embodiment of the invention, when the transmission device 100 and the receiving device 200 fail to establish the touch-link, the transmission device 100 will perform a reconnection mechanism. Taking the transmission device 100 and the receiving device 200 for example, the transmission device 100 may transmit the reconnection request to the receiving device 200 through the link module 120 according to the reconnection mechanism. In an embodiment of the invention, when the link (reconnection) has been established, the receiving device 200 will transmit an acknowledgement (ACK) signal to the transmission device 100 to inform the transmission device 100 that the link has been established. In an embodiment of the invention, the reconnection mechanism further comprises a threshold for the number of transmitted reconnection requests. When the number of transmitted reconnection requests is more than the threshold, the transmission device 100 will stop transmitting the reconnection request. In another embodiment of the invention, the reconnection mechanism further comprises a default time. When the time it takes to transmit the reconnection requests is longer than the default time, the transmission device 100 will stop transmitting the reconnection request.

In an embodiment of the invention, when the link has been established and the transmission device 100 and the receiving device 200 fail to transmit the data or signal, the transmission device 100 will perform a retransmission mechanism (if the link is not broken). Taking the transmission device 100 and the receiving device 200 for example, the transmission device 100 may transmit a retransmission request to the receiving device 200. In an embodiment of the invention, when the transmission of the data or signal is recovered, the receiving device 200 will transmit an acknowledgement (ACK) signal to the transmission device 100 to inform the transmission device 100 that the data or signal has been received successfully. In an embodiment of the invention, the retransmission mechanism further comprises a threshold for the number of transmitted retransmission requests. When the number of transmitted retransmission requests is more than the threshold, the transmission device 100 will stop transmitting the retransmission request. In another embodiment of the invention, the retransmission mechanism further comprises a default time. When the time it takes to transmit the retransmission request is longer than the default time, the transmission device 100 will stop transmitting the retransmission request. In addition, when the transmission device 100 and the receiving device 200 fail to transmit the data or signal and the link is broken, the transmission will perform the reconnection mechanism first.

In an embodiment of the invention, when the link has been established, the judgment module 130 may determine which display areas of the touch-display module 110 the receiving device 200 and the receiving device 300 are in physical proximity to, to generate the judgment information. Then, the judgment module 130 transmits the judgment information to the management module 140 to inform the management module 140 of the applications which are running on the display areas which the receiving device 200 and the receiving device 300 approach and the related data of these applications. Taking FIG. 6A for example, if display area A1 is configured to display a movie and display area A2 is configured to browse a web page, when the receiving device 200 is in physical proximity to display area A1 and the receiving device 300 is in physical proximity to display area A2, the judgment module 130 will transmit the judgment information to the management module 140 to inform the management module 140 that the receiving device 200 is in physical proximity to display area A1, which is configured to play a movie, and the receiving device 300 is in physical proximity to display area A2, which is configured to browse a web page. In an embodiment of the invention, the receiving device 200 and the receiving device 300 can also approach the same display area at the same time, or approach the same display area individually. Taking FIG. 6A for example, the receiving device 200 and the receiving device 300 can approach display area Al (or display area A2) at the same time, or approach display area A1 (or display area A2) individually. In an embodiment of the invention, when the receiving device 200 and/or the receiving device 300 approach a plurality of display areas of the touch-display module 110 at the same time, the judgment module 130 can determine which area the receiving device 200 and/or the receiving device 300 approach according to the percentage of the physical proximity areas corresponding to the display areas which the receiving device 200 and/or the receiving device 300 approach. For example, if the receiving device 200 approaches display area A1 and display area A2 at the same time, and the physical proximity area corresponding to display area A1 is 70% and the physical proximity area corresponding to display area A2 is 30%, the judgment module 130 will determine that the receiving device 200 is approaching display area A1.

Figure 6C:
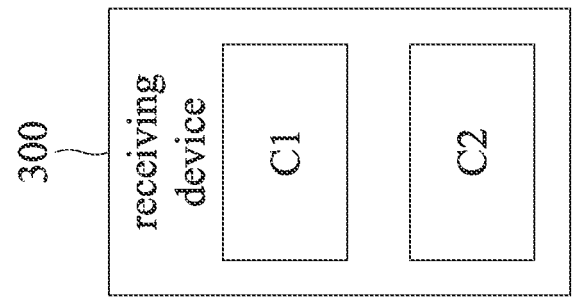
FIG. 6C is a schematic diagram illustrating the receiving device 300 according to an embodiments of the invention.
Figure 6B:
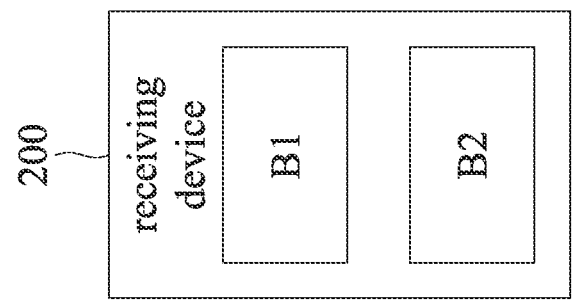
FIG. 6B is a schematic diagram illustrating the receiving device 200 according to an embodiments of the invention.
Figure 6A:
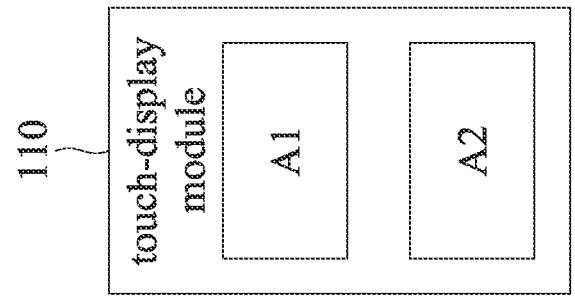
FIG. 6A is a schematic diagram illustrating the touch-display module 110 according to an embodiment of the invention.

FIG. 6B and FIG. 6C are schematic diagrams illustrating the receiving device according to embodiments of the invention. In an embodiment of the invention, the receiving device 200 and receiving device 300 also comprise a plurality of display areas. As shown in FIG. 6B and FIG. 6C, the receiving device 200 comprises display area B1 and display area B2 and the receiving device 300 comprises display area C1 and display area C2, wherein the display areas of the receiving device 200 and the receiving device 300 can approach the touch-display module 110 at the same time, or approach the touch-display module 110 individually. Taking FIG. 6B and FIG. 6C for example, the display areas B1 and B2 of the receiving device 200 can approach the display areas A1 and A2 respectively, and the display areas C1 and C2 of the receiving device 300 can also approach the display areas A1 and A2 respectively. For example, if display area A1 is configured to display movies and display area A2 is configured to browse the web, when the display area B1 of the receiving device 200 is in physical proximity to display area A1 and the display area B2 of the receiving device 200 is in physical proximity to display area A2, the judgment module 130 will transmit the judgment information to the management module 140 to inform the management module 140 that the display area B1 is in physical proximity to display area A1 which is configured to display a movie and the display area B2 is in physical proximity to display area A2 which is configured to browse the web. For another example, when the display area B1 of the receiving device 200 is in physical proximity to display area A1 and the display area C2 of the receiving device 300 is in physical proximity to display area A2, judgment module 130 will transmit the judgment information to the management module 140 to inform the management module 140 that the display area B1 is in physical proximity to display area A1 which is configured to display a movie and the display area C2 is in physical proximity to display area A2 which is configured to browse the web page. In an embodiment of the invention, the display areas of the receiving device 200 and receiving device 300 may have previously been set to correspond to specific functions. For example, if the display areas B1 and C1 are set to display movies, only when the display areas B1 and C1 approach display area A1, the judgment module 130 performs the judgment. If the display areas B1 and C1 approach display area A2, the judgment module 130 will not perform the judgment. Note that the display areas of FIG. 6A-6C are only to clarify the concept of the invention, but the invention should not be limited thereto. The transmission device 100, receiving device 200, and receiving device 300 can also include single display area or more display areas.

In an embodiment of the invention, the transmission device 100 also comprises a search module (not shown in figures). The judgment module 130 may transmit the judgment result to the search module, after the judgment module 130 determines the display areas which the receiving device 200 and receiving device 300 approach. The search module may find the applications corresponding to the display areas which the receiving device 200 and receiving device 300 approach, and transmit the search result to the judgment module 130, wherein the search result comprises the names of the applications, etc. The judgment module 130 may generate the judgment information according to the search result after obtaining the search result, and transmit the judgment information to the management module 140. The management module 140 will generate the application information according to the judgment information, after receiving the judgment information. Then, the sending module 150 transmits the application information to the receiving device 200 and the receiving device 300.

In an embodiment of the invention, the judgment module 130 also determines whether the size of the executed file is larger than a default value. If the size of the executed file is larger than a default value, the application information will only comprise the names of the application and executed file, such as the names of the display software and the music displayed through the display software. That is to say, the sending module 150 only transmits the names of the application and executed file to the receiving device 200 and/or receiving device 300, but doesn't transmit the data related to the executed file to the receiving device 200 and/or receiving device 300.

If the size of the application is not larger than a default value, the application information comprises the names of the application and executed file and the data of the executed file, such as the names of the music display software and the displayed music and data of the displayed music, or the name of the browser, and the Universal Resource Locator (URL) and data of the web page. That is to say, the sending module 150 may transmit the data of the executed file of the application to the receiving device 200 and/or receiving device 300 directly. Therefore, the receiving device 200 and/or receiving device 300 will not search for and request the data of the executed file.

In an embodiment of the invention, when the application information transmitted from the transmission device 100 to the receiving device 200 and/or receiving device 300 does not comprise the data of the executed file and the receiving device 200 and/or receiving device 300 also does not have the data of the executed file, the receiving device 200 and/or receiving device 300 may transmit a request to the transmission device 100 to request the transmission device 100 to transmit the data related to the executed file. The receiving module 160 may transmit the request to the management module 140 after the receiving module 160 receives the request from the receiving device 200 and/or receiving device 300. The management module 140 may indicate the sending module 150 to transmit the data related to the executed file to the receiving device 200 and/or receiving device 300.

Figure 7:
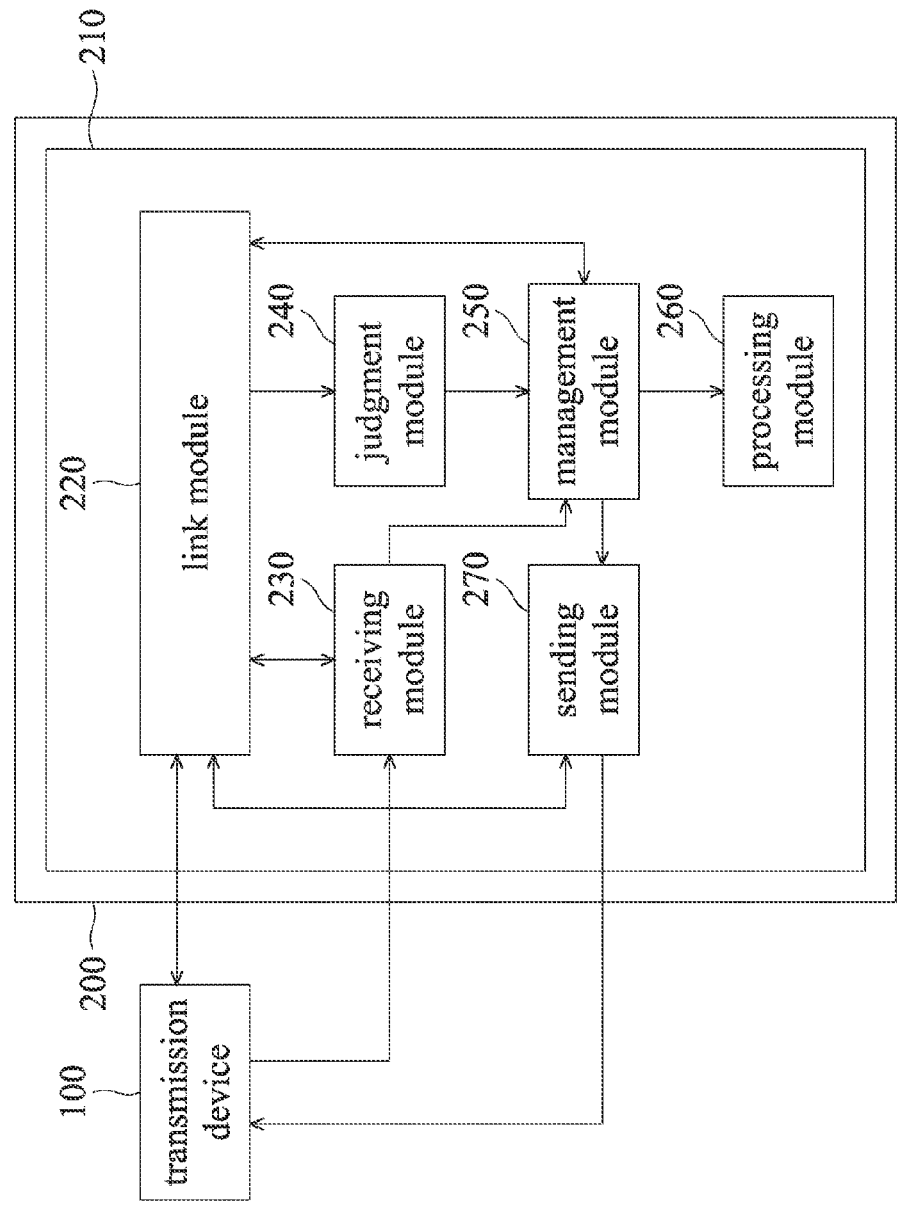
FIG. 7 is schematic diagram illustrating the receiving device 200 according to an embodiment of the invention.

FIG. 7 is schematic diagram illustrating the receiving device 200 according to an embodiment of the invention. As shown in FIG. 7, the receiving device 200 comprises a touch-display module 210, link module 220, receiving module 230, judgment module 240, management module 250, processing module 260 and sending module 270. The receiving device 200 of FIG. 7 is only used as an example to clarify the concept of the invention, and the invention should not be limited thereto. The receiving device 200 can also include other modules and elements. The schematic diagram of receiving device 300 is the same as that of receiving device 200, and a detailed description thereof is omitted here for the sake of brevity.

In an embodiment of the invention, the touch-display module 210 is configured to approach one or more display areas of the touch-display module 110 of the transmission device 100. The link module 220 establishes the link with the link module 120 of the transmission device 100 through the touch-display module 110 according to the touch-link technology. The receiving module 230 receives the application information corresponding to the physical-proximity display areas from the sending module 150 of the transmission device 100, wherein the application information comprises the names of the application and executed file, such as the names of the music display software and the displayed music. The judgment module 240 may determine whether the receiving device 200 has installed the application and whether the receiving device 200 has the executed file according to the application information, and generate a judgment result corresponding to the application information. The management module 250 determines how to obtain the data of the application and executed file according to the judgment result. When the receiving device 200 has obtained the data of the application and executed file, the processing module 260 may execute the application and file and the touch-display module 210 may display the display result corresponding to the application information. For example, if the music is displaying on display area A1 of the touch-display module 110 which the display area B1 of the touch-display module 210 is in physical proximity to, when the receiving device 200 has obtained the application and executed file, the processing module 260 will execute the same music display software and display music on the display area B1 of the touch-display module 210.

In an embodiment of the invention, if the judgment result indicates that the receiving device 200 does not install the application according to the judgment result, the management module 250 will orders the application to be download from the network, such as an app store. After downloading the application, the management module 250 will install the application.

In an embodiment of the invention, if the judgment result indicates that the receiving device 200 does not have the file according to the judgment result, the management module 250 will command the sending module 270 to transmit a request to the transmission device 100 to request that the transmission device 100 transmit the data related to the file to the receiving device 200. In an embodiment of the invention, the data related to the file can also be transmitted with application information to the receiving device 200 by the transmission device 100.

In an embodiment of the invention, if the judgment module 240 determines that the receiving device 200 has the application and file, the management module 250 will indicate the processing module 260 to execute the application and file.

In an embodiment of the invention, when the management module 250 fails to download the application from the network, the management module 250 will perform a re-download mechanism. The management module 250 orders the application to be downloaded from the network again according to the re-download mechanism. In an embodiment of the invention, the re-download mechanism further comprises the default value. When the number of re-downloads of the management module 250 is more than the default value, the management module 250 stops downloading the application and does not request that the transmission device 100 transmit any data. In another embodiment of the invention, the re-download mechanism further comprises the default time. When the management module 250 does not obtain the application during the default time, the management module 250 stops downloading the application and does not ask the transmission device 100 to transmit any data.

In an embodiment of the invention, the touch-display module 210 can also comprise more display areas, and the display areas of the touch-display module 210 can approach the display areas of the touch-display module 110 at the same time, or approach the display areas of the touch-display module 110 individually. There are detailed descriptions in the embodiments described above, and a detailed description thereof is omitted here for the sake of brevity.

Figure 8:
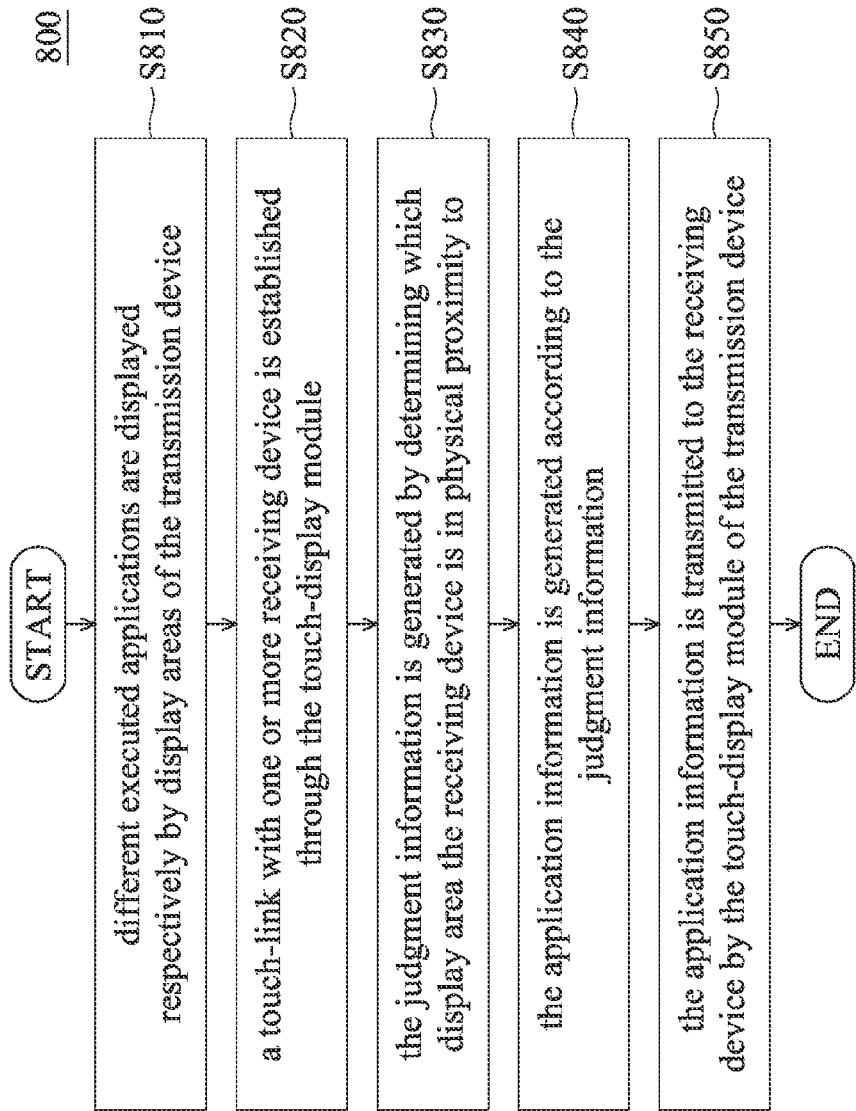
FIG. 8 is a flow chart illustrating the method of sharing data according to an embodiment of the invention.

FIG. 8 is a flow chart illustrating the method of sharing data according to an embodiment of the invention. The method is applied for the transmission device 100. In step S810, different executed applications are displayed respectively by display areas of the transmission device. In step S820, a touch-link with one or more receiving devices is established through the touch-display module, wherein the touch-link is established according to the touch-link technology of FIG. 1-FIG. 4. In step S830, the judgment information is generated by determining which display area the receiving device is in physical proximity to. In step S840, the application information is generated according to the judgment information. In an embodiment of the invention, the application information comprises the names of the application and the executed file, and data of the executed file. In another embodiment of the invention, the application information only comprises the names of the application and the executed file. In step S850, the application information is transmitted to the receiving device by the touch-display module of the transmission device, after generating the application information.

In an embodiment of the invention, step S830 further comprises the following action: after determining that the receiving device is in physical proximity to the display area, the application corresponding to the display area which the receiving device approaches is searched, and then a search result is generated. The search result is comprised in the judgment information to determine which application and file are being executed on the display area which the receiving device is in physical proximity to.

In an embodiment of the invention, step S830 further comprises determining whether the size of the executed file is larger than a default value. If the size of the executed file is larger than a default value, the application information will only comprise the names of the application and executed file. If the size of the application is not larger than a default value, the application information comprises the names of the application and executed file, and the data of the executed file. When the transmission device does not provide the data related to the executed file to the receiving device and the receiving device does not have the data related to the executed file, the receiving device will transmit a request to the transmission device, and then the transmission device may transmit the data related to the executed file to the receiving device according to the request through the touch-display module of the transmission device.

In an embodiment of the invention, the receiving device can also comprise a plurality of display areas, and the display areas of the receiving device can approach the same or different display areas of the transmission device at the same time, or approach the same or different display areas of the transmission device individually. Therefore, the transmission device may determine which display areas of the transmission device are being approached by the respective display areas of the receiving device.

Figure 9:
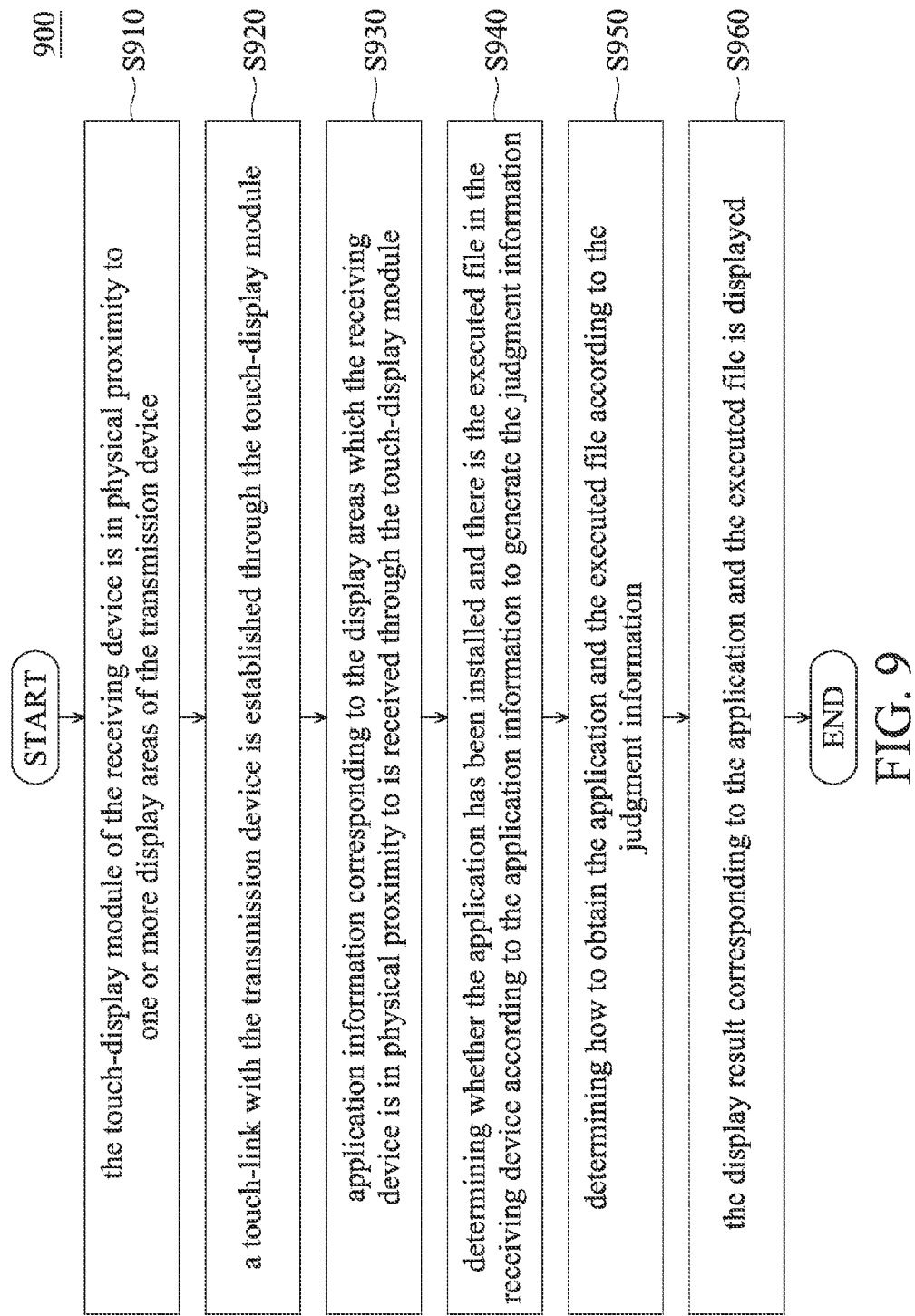
FIG. 9 is a flow chart illustrating the method of sharing data according to another embodiment of the invention.

FIG. 9 is a flow chart illustrating the method of sharing data according to another embodiment of the invention. The method is applied to the receiving devices 200 and 300. In step S910, the touch-display module of the receiving device is in physical proximity to one or more display areas of the transmission device. In step S920, a touch-link with the transmission device is established through the touch-display module, wherein the touch-link is established according to the touch-link technology of FIG. 1-FIG. 4. In step S930, application information corresponding to the display areas which the receiving device is in physical proximity to is received through the touch-display module. In an embodiment of the invention, the application information comprises the names of the application and the executed file, and data of the executed file. In another embodiment of the invention, the application information only comprises the names of the application and the executed file.

In step S940, the receiving device determines whether the application has been installed and there is the executed file in the receiving device according to the application information to generate the judgment information. In step S950, the receiving device determines how to obtain the application and the executed file according to the judgment information. In an embodiment of the invention, if the judgment information indicates that the receiving device does not install the application, the receiving device will download the application. In an embodiment of the invention, if the judgment information indicates that the receiving device does not have the executed file, i.e. the transmission device does not transmit the data related to the executed file to the receiving device and the receiving device does not also have the executed file itself, the receiving device will transmit a request through the touch-display module to the transmission device to request that the transmission device transmits the data related to the executed file. In an embodiment of the invention, if the judgment information indicates that the application has been installed and there is the executed file in the receiving device, the receiving device will execute the application and the executed file. In step S960, the display result corresponding to the application and the executed file is displayed by the touch-display module of the receiving device According to the method for sharing data of the invention, the user can establish the link between the transmission device and other receiving devices rapidly by the touch-link technology for the physical proximity of the devices. Then, the transmission device transmits the application information corresponding to the display area which is in physical proximity to the receiving device to the receiving device to execute the same application and the file on the receiving device directly and rapidly. In addition, the method for sharing data of the invention may be also applied in more display areas of the devices which are in physical proximity with each other to execute different applications and the files corresponding to different the display areas of the transmission device on the different display areas of the receiving device.

The embodiments of the above touch link methods according to the present invention could be implemented by various kinds of hardware, software codes or the combination of them. For example, the embodiments of the present invention could be circuits of the integrated video compression chip or the integrated video compression software to execute the program code of the above process. The embodiments of the present invention could be the program codes executed by the digital signal processor (DSP). The present invention could also relate to several functions executed by the computer processor, the DSP, the microcontroller or the field programmable gate array (FPGA). The above processors could be arranged according to the present invention to execute certain functions which could be performed by the fixed code or the machine-readable software code of the specific methods disclosed by the present invention. The software code or fixed code could be developed as different programs or different formats, or could be compiled for different object platform. However, the different code, type or language of the software code and other types of allocation code according to the present invention is not away from the scope or range of the present invention.

The terms such as "first", "second", "third" for describing the components in the specifications or claims do not indicate any priority right, priority sequence, or a timing sequence that a level of a component is higher than the level of another component or execution method. They are only labels to distinguish a component with specific name and another component with the same name (except the describing term).

While the invention has been described by way of example and in terms of the preferred embodiments, it is to be understood that the invention is not limited to the disclosed embodiments. On the contrary, it is intended to cover various modifications and similar arrangements as would be apparent to those skilled in the art. In addition, those skilled in the art should appreciate that they can readily use the disclosed conception and specific embodiments as a basis for designing or modifying other structures for carrying out the same purposes of the present invention without departing from the scope of the invention as defined by the appended claims.

What is claimed is:

1. A transmission device, comprising:
a touch-display module, comprising one or a plurality of display areas, wherein each of the display areas displays a respective display result corresponding to the same or different applications;
a link module, configured to establish a touch link with one or a plurality of receiving devices through the touch-display module;
a judgment module, configured to determine the display area which the receiving device is in physical proximity to, to generate the judgment information;
a management module, configured to generate application information according to the judgment information; and
a sending module, configured to transmit the application information to the receiving device through the touch-display module.

2. The transmission device of claim 1, further comprising:
a search module, configured to search for the application corresponding to the display area which the receiving device is in physical proximity to and transmit a search result to the judgment module, after the judgment module knows the display area which the receiving device is in physical proximity to.

3. The transmission device of claim 2, wherein the judgment module transmits the judgment information to the management module according to the search result, after obtaining the search result.

4. The transmission device of claim 1, wherein the judgment module also determines whether a size of an executed file of the application is larger than a default value.

5. The transmission device of claim 4, wherein when the size of the executed file of the application is larger than the default value, the application information transmitted by the sending module only comprises names of the application and the executed file; and when the size of the executed file of the application is not larger than the default value, the application information transmitted by the sending module comprises names of the application and the executed file and data of the executed file.

6. The transmission device of claim 4, further comprising:
a receiving module, configured to receive a request transmitted from the receiving device through the touch-display module, wherein the sending module transmits data corresponding to the request to the receiving device through the touch-display module.

7. The transmission device of claim 1, wherein the link module establishes the touch link with the receiving devices by a touch link technology at the same time, or individually.

8. The transmission device of claim 1, wherein a second touch-display module of the receiving device further comprises a plurality of second display areas and the second display areas are in physical proximity to the same or different display areas of the touch-display module at the same time, or individually.

9. The transmission device of claim 8, wherein each second display area is preset to display the display result corresponding to a specific application of the applications.

10. The transmission device of claim 8, wherein when one of the second display areas is in physical proximity to the display areas, the judgment module determines which display area the second display area is in physical proximity to according to a percentage of physical proximity areas.

11. The transmission device of claim 1, wherein when the touch link is a failure, a reconnection mechanism is performed by the link module.

12. The transmission device of claim 1, wherein when the sending module fails to transmit the application information, a transmission mechanism is performed by the link module.

13. A method of sharing data for a transmission device, comprising:
displaying a display result of an application executed on a display area of the transmission device or displaying display results of different applications executed on a plurality of display areas of the transmission device, wherein the display areas are comprised in a touch-display module;
establishing a touch link with one or a plurality of receiving devices through the touch-display module;
determining the display area which the receiving device is in physical proximity to, to generate the judgment information;
generating application information according to the judgment information; and
transmitting the application information to the receiving device through the touch-display module.

14. The method of claim 13, further comprising:
searching for the application corresponding to the display area which the receiving device is in physical proximity to for generating a search result, after determining that the receiving device is in physical proximity to the display area; and
comprising the search result in the judgment information.

15. The method of claim 13, further comprising:
determining whether a size of an executed file of the application is larger than a default value.

16. The method of claim 15, wherein when the size of the executed file of the application is larger than the default value, the application information only comprises names of the application and the executed file; and when the size of the executed file of the application is not larger than the default value, the application information comprises names of the application and the executed file and data of the executed file.

17. The method of claim 15, further comprising:
receiving a request transmitted from the receiving device through the touch-display module and transmitting the executed file to the receiving device according to the request.

18. The method of claim 13, wherein the touch link with the receiving devices is established at the same time, or individually.

19. The method of claim 13, wherein the receiving device comprises a second touch-display module, and the second touch-display module of the receiving device further comprises a plurality of second display areas and the second display areas are in physical proximity to the same or different display areas of the touch-display module at the same time, or individually.

20. The method of claim 19, wherein each second display area is preset to display the display result corresponding to one of the applications.

21. The method of claim 19, further comprising:
  determining which display area the second display area is in physical proximity to according to a percentage of physical proximity areas when one of the second display areas is in physical proximity to the display areas.

22. The method of claim 13, further comprising:
  performing a reconnection mechanism when the touch link is a failure.

23. The method of claim 13, further comprising:
  performing a transmission mechanism when the sending module fails to transmit the application information.

* * * * *